United States Patent [19]

Wein

[11] 4,104,161
[45] Aug. 1, 1978

[54] METHOD FOR TREATING AQUEOUS WASTES CONTAINING AT LEAST 1% PROTEINACEOUS MATTER

[75] Inventor: Gary M. Wein, Hanover Park, Ill.

[73] Assignee: Nalco Chemical Company, Oak Brook, Ill.

[21] Appl. No.: 788,200

[22] Filed: Apr. 18, 1978

[51] Int. Cl.$^2$ ................................................ C02B 1/20
[52] U.S. Cl. ............................ 210/54; 210/DIG. 23; 260/112 R; 260/112 B
[58] Field of Search ............... 210/54 C, 54 R, 52, 210/10, 45, DIG. 23; 260/112 B, 112 R

[56] References Cited

U.S. PATENT DOCUMENTS

| | | | |
|---|---|---|---|
| 2,597,228 | 5/1952 | Cornwell et al. | 260/112 B |
| 3,372,129 | 3/1968 | Phillips et al. | 210/54 C |
| 3,607,738 | 9/1971 | Nelson | 210/18 |
| 3,725,312 | 4/1973 | Panzer et al. | 210/54 C |
| 3,839,314 | 10/1974 | Fekete et al. | 210/DIG. 23 |
| 3,865,723 | 2/1975 | Marchisio et al. | 210/54 C |

OTHER PUBLICATIONS

Babbitt, H. E. et al.; "Sewerage & Sewage Treatment"; John Wiley & Sons Inc. (8th Ed.); New York; pp. 360–362 (1958).

*Primary Examiner*—Charles N. Hart
*Assistant Examiner*—Benoit Castel
*Attorney, Agent, or Firm*—John G. Premo; Robert A. Miller; Barry W. Sufrin

[57] ABSTRACT

A method for treating aqueous wastes containing at least 1% proteinaceous matter with at least 0.20% by weight of cationic water-soluble polyamines. Preferred polyamines include ethylene dichloride-ammonia, quaternary ethylene dichloride-ammonia and dimethylamine-epichlorohydrin-ammonia polymer.

3 Claims, No Drawings

METHOD FOR TREATING AQUEOUS WASTES CONTAINING AT LEAST 1% PROTEINACEOUS MATTER

BACKGROUND

FIELD OF THE INVENTION

This invention relates to a process for treating rendering plant type wastes. The term "rendering plant" is used to refer to those industrial facilities which are engaged in the killing and/or processing of animals, fish, poultry, dairy products and the like.

Various types of proteinaceous refuse are produced in rendering plants. Rendering plant effluent streams thus contain varying amounts of non-recovered proteinaceous matter diluted with wash water.

Within the present state of the art, diverse coagulation methods are available for removing proteinaceous and other matter from the rendering plant effluents. These methods include steam coagulation and lignin treatments. Alternatively, conventional coagulation chemicals are applied in low dosages to flocculate, coagulate and precipitate rendering plant wastes.

However, these prior methods have very significant drawbacks especially when it is desirable to reuse the high protein precipitant. Lignin treatment, for example, has very unfavorable stoichiometry which results in a product containing 30 or more percent lignin. The introduction of these large amounts of lignin interferes with the economics and the overall efficiency of the utilization of the precipitant as feed. Steam coagulation and pH adjustment are similarly impractical as the sole treatment method due to unfavorable cost effectiveness. Finally, the use of low dosages of polyelectrolytes (5–100 range based on weight) to coagulate rendering plant wastes has been found to be effective only where the effluents contain concentrations of proteinaceous matter significantly below 1%.

Where rendering plant effluents contain 1% or more proteinaceous matter, the traditional treatment methods have been found to be especially ineffective. The usual dosages of polyelectrolytes, for example, have been found to be almost totally ineffective in treating these high protein level effluents. I have now discovered that certain polyelectrolytes at heretofore unprecedented concentrations will surprisingly and efficiently flocculate, agglomerate and precipitate rendering plant effluents containing greater than 1% by weight proteinaceous matter.

OBJECTS

It is therefore a prime object of the invention to provide a method for treating rendering plant effluents containing greater than 1% by weight proteinaceous matter whereby the proteinaceous matter may be separated from the water.

It is a further object of the invention to provide a practical method whereby the proteinaceous matter may be recovered from rendering plant effluents containing high concentrations of proteinaceous matter.

Another object of my invention is to provide a practical method for treating blood and blood plant wastes and for recovering proteinaceous matter therefrom.

Other objects will appear hereinafter.

THE INVENTION

The invention entails a method for treating aqueous wastes containing at least 1% by weight of proteinaceous matter which comprises:

A. adding at least 0.02% by weight based on dry proteinaceous matter of a water-soluble polyamine to the aqueous wastes;
B. dispersing said polyamine within the aqueous wastes;
C. allowing the aqueous wastes to stand for a sufficient period of time to allow the flocs and proteinaceous matter to coagulate and settle thereby producing a precipitate of proteinaceous matter; and,
D. recovering the precipitate of proteinaceous matter.

The treatment of my invention will be useful when handling any aqueous wastes containing greater than 1% by weight proteinaceous matter. However, my invention is especially important for the treatment of blood and blood serum since these materials are very difficult to coagulate. Blood plant effluents usually include raw blood which probably contains about 25% protein solids and blood serum which probably contains about 15% protein solids.

When treating raw blood, it may be necessary to either dilute the blood or to dilute the water-soluble polyamine in order to obtain water:protein solids ratios of 7:1 or greater. When treating blood serum, it may not be necessary to dilute with water.

My invention may also be used, as noted earlier, to treat overall rendering plant effluents. These effluents are generally a mix of blood serum, condensibles from the rendering operation and wash waters from cleaning working surfaces within the plant. Generally, the protein levels in these effluents are considerably lower than the levels in either blood or blood serum. Accordingly, reduced amounts of the polyamines will be needed.

A key advantage of my invention is that it offers a practical method for recovering protein solids for reuse. Since these protein solids can be sold for use as high protein feed or for other purposes, this advantage of my invention must be factored into any economic evaluations of my overall invention.

Dosages

At least 0.20% by weight of the water-soluble polyamines will be needed to treat the aqueous wastes containing greater than 1% by weight proteinaceous matter. When treating blood serum, at least 0.30% by weight of the polyamine will be needed. Preferably 0.45% would be used.

As noted in example 1, in some cases the threshhold amounts of polyamine needed to clarify blood serum will vary significantly. Differences can be expected due to contaminents in serum samples and due to varying activity between different polyamines. However, in practice, the optimal dosage will be determined on a case by case basis.

The Polyamines

Generally known water-soluble cationic polyamines will function in the coagulation method of my invention. Preferable polyamines include ethylene dichloride-ammonia, quaternary ethylene dichloride-ammonia and dimethylamine-epichlorohydrin-ammonia polymer. Most preferable among these is the dimethylamine-epichlorohydrinammonia polymer. Typical synthesis methods for these molecules may be found in the following U.S. Pat. Nos. 3,372,129 (ethylene dichloride-ammonia), 3,751,474 (ethylene dichloride-ammonia) and 3,738,945 (dimethylamine-epichlorohydrin-ammonia).

EXAMPLES

EXAMPLE 1

Coagulation studies were performed on rendering plant serum water using polyamines with results as shown in Table I. Blood serum for testing was produced within the rendering plant as follows:

1. Blood was placed in a mixing tank and coagulated with steam in a screw lift conveyer.
2. Blood solids were removed in a gross filter for drying.
3. Gross filtrate was further filtered on a fine mesh vibrating filter and more solids removed for drying.
4. Filtrate from the fine filter constituted the serum water.

The polyamines were evaluated in jar tests. Jar tests were carried out by placing 500 ml of serum water in a liter jar, adding polyamine and stirring for about 3 minutes at about 60 rpm. The mixture was further stirred for about 3 minutes at about 120 rpm and then the sample was allowed to stand for about 6 minutes. Floc size, floc settling rate and supernate clarity were evaluated on a scale of 0–10 wherein 5 = control, 0–5 = poorer than control and 5–10 = better than control.

EXAMPLE 2

Coagulation studies using jar tests similar to those described in Example 1 were carried out on another set of blood serum samples. Dosages and results are reported in Table II.

EVALUATION OF DATA IN EXAMPLES 1 AND 2

An examination of the data reported in Table I (Example 1) shows good flocculation at dosages in excess of 1.2% by weight of polyamine. For these test samples, it was found that dosages below 1.2% generally did not flocculate the serum water protein solids.

In Example 2, it was found that polyamine dosages as low as 0.48% by weight resulted in good coagulation. Dosages below this amount resulted in little or no coagulation.

The difference in the results reported in these two examples are believed to be due to differences in the serum water being clarified. It is believed, for example, that in Example 2 the serum water may have been allowed to stand for from a number of hours to possibly several days before clarification. Also, there is a possibility that different contaminants were present in the serum waters tested in the two examples. Nevertheless, it will be noted that in all cases the polyamine dosages were far in excess of what would normally be utilized to coagulate industrial effluents.

Table I

SERUM WATER CLARIFICATION

| TRIAL | TREATMENT CHEMICAL | DOSAGE (% BY WEIGHT)* | FLOC SIZE | FLOC SETTLING RATE | SUPERNATE CLARITY | REMARKS |
|---|---|---|---|---|---|---|
| 1 | Dimethylamine-Epichlorohydrin Ammonia Polymer | 0.75 | 5 | 5 | 5 | Nothing |
| 2 | Dimethylamine-Epichlorohydrin Ammonia Polymer | 1.2 | 5 | 5 | 5 | |
| 3 | Dimethylamine-Epichlorohydrin Ammonia Polymer | 1.2 | 5 | 5 | 5 | |
| 4 | Dimethylamine-Epichlorohydrin Ammonia Polymer | 3.0 | 7 | 6 | 6 | Good floc |
| 5 | Dimethyl-Epichlorohydrin Ammonia Polymer | 3.75 | 8 | 8 | 8 | |
| 6 | Dimethylamine-Epichlorohydrin Ammonia Polymer | 6.0 | 8 | 8 | 8 | Good floc, good settling |
| 7 | Dimethylamine-Epichlorohydrin Ammonia Polymer | 1.2 | 8 | 9 | 8 | |
| 8 | Dimethylamine-Epichlorohydrin Ammonia Polymer | 6.75 | 8 | 9 | 8 | |
| 9 | Alum | 1.0 | 8 | 6 | 6 | Good floc |
| 10 | Alum | 2.5 | 8 | 6 | 6 | |
| 11 | Alum | 2.5 | 8 | 6 | 6 | |
| 12 | Dimethylamine-Epichlorohydrin Ammonia Polymer/Alum | 3.0/1.0 | 7 | 7 | 7 | |
| 13 | Dimethylamine-Epichlorohydrin Ammonia Polymer/Alum | 0.75/0.5 | | | | Nothing |
| 14 | Dimethylamine-Epichlorohydrin Ammonia Polymer/Alum | 0.75/1.0 | | | | |
| 15 | Dimethylamine-Epichlorohydrin Ammonia Polymer/Alum | 0.75/2.0 | | | | Fine pin point floc |
| 16 | Dimethylamine-Epichlorohydrin Ammonia Polymer/Alum | 0.75/5.0 | | | | Good floc, good clarity |

*Based on dry solids

TABLE II

SERUM WATER CLARIFICATION

| Trial | Treatment Chemical | Dosage (% By Weight)* | pH | Remarks |
|---|---|---|---|---|
| 1 | Dimethylamine-Epichlorohydrin-Ammonia Polymer | 0.48 | 7.0 | Good floc, supernate clarity, fast settling, % solids 46% |
| 2 | Dimethylamine-Epichlorohydrin-Ammonia Polymer | 0.30 | 7.0 | Nothing |
| 3 | Dimethylamine-Epichlorohydrin-Ammonia Polymer | 0.60 | 7.0 | Very good floc settling time and compaction |
| 4 | Dimethylamine-Epichlorohydrin-Ammonia Polymer/ | 0.48 | 4.0 | Good heavy floc, good settling time, |

TABLE II-continued
SERUM WATER CLARIFICATION

| Trial | Treatment Chemical | Dosage (% By Weight)* | pH | Remarks |
|---|---|---|---|---|
| 5 | Hydrochloric Acid Dimethylamine-Epichlorohydrin-Ammonia Polymer/Bentonite Clay | 0.48/0.012 | 7.0 | highly colored supernate Good coagulation, small floc, good settling, fair supernate clarity |
| 6 | Dimethylamine-Epichlorohydrin-Ammonia Polymer/Silica | 0.48/0.012 | 7.0 | Very good floc, fast settling time, good compaction |
| 7 | Dimethylamine-Epichlorohydrin-Ammonia Polymer | 0.48 | 7.0 | Good floc and settling |
| 8 | Ethylene Dichloride-Ammonia Polymer | 0.20 | 7.0 | Pinpoint floc, very slow settling |
| 9 | Ethylene Dichloride-Ammonia Polymer | 0.20 | 4.0 | Pinpoint floc, poor settling |
| 10 | Ethylene Dichloride-Ammonia Polymer | 0.25 | 7.0 | Nothing |
| 11 | Ethylene Dichloride-Ammonia Polymer | 0.50 | 7.0 | Good floc, supernate clarity, fast settling time |
| 12 | Ethylene Dichloride-Ammonia Polymer | 0.50 | 7.0 | Very good floc, settling, and compaction |
| 13 | Ethylene Dichloride-Ammonia Quaternary Polymer | 0.30 | 7.0 | Very poor |
| 14 | Ethylene Dichloride-Ammonia Quaternary Polymer/Silica | 0.30/0.012 | 7.0 | Very poor |
| 15 | Ethylene Dichloride-Ammonia Polymer/Acid/ Dimethylamine-Epichlorohydrin-Ammonia Polymer | 0.20/acid/0.48 | 4.0 | Good floc, slow settling |
| 16 | Acrylamide-Formaldehyde-Dimethylamine Mannich Product | 0.012 | 7.0 | No coagulation |

*Based on dry solids

I claim:

1. A method for treating rendering plant aqueous wastes containing at least 1% by weight of proteinaceous matter which comprises:
   A) adding at least 0.48% by weight based on dry proteinaceous matter of a water-soluble polyamine polymer to the aqueous wastes, said polymer being chosen from the group consisting of ethylene dichloride-ammonia, ethylene dichloride-ammonia-methyl chloride, and dimethylamine-epichlorohydrin-ammonia;
   B) dispersing said polyamine within the aqueous wastes;
   C) allowing the aqueous wastes to stand for a sufficient period of time to allow the flocs of proteinaceous matter to coagulate and settle thereby producing a precipitate of proteinaceous matter; and,
   D) recovering the precipitate of proteinaceous matter.

2. The method of claim 1 wherein the quantity of the polyamine polymer is at least 1.2% by weight.

3. The method of claim 1 wherein the proteinaceous matter is blood or blood serum.

* * * * *